Patented Feb. 21, 1950

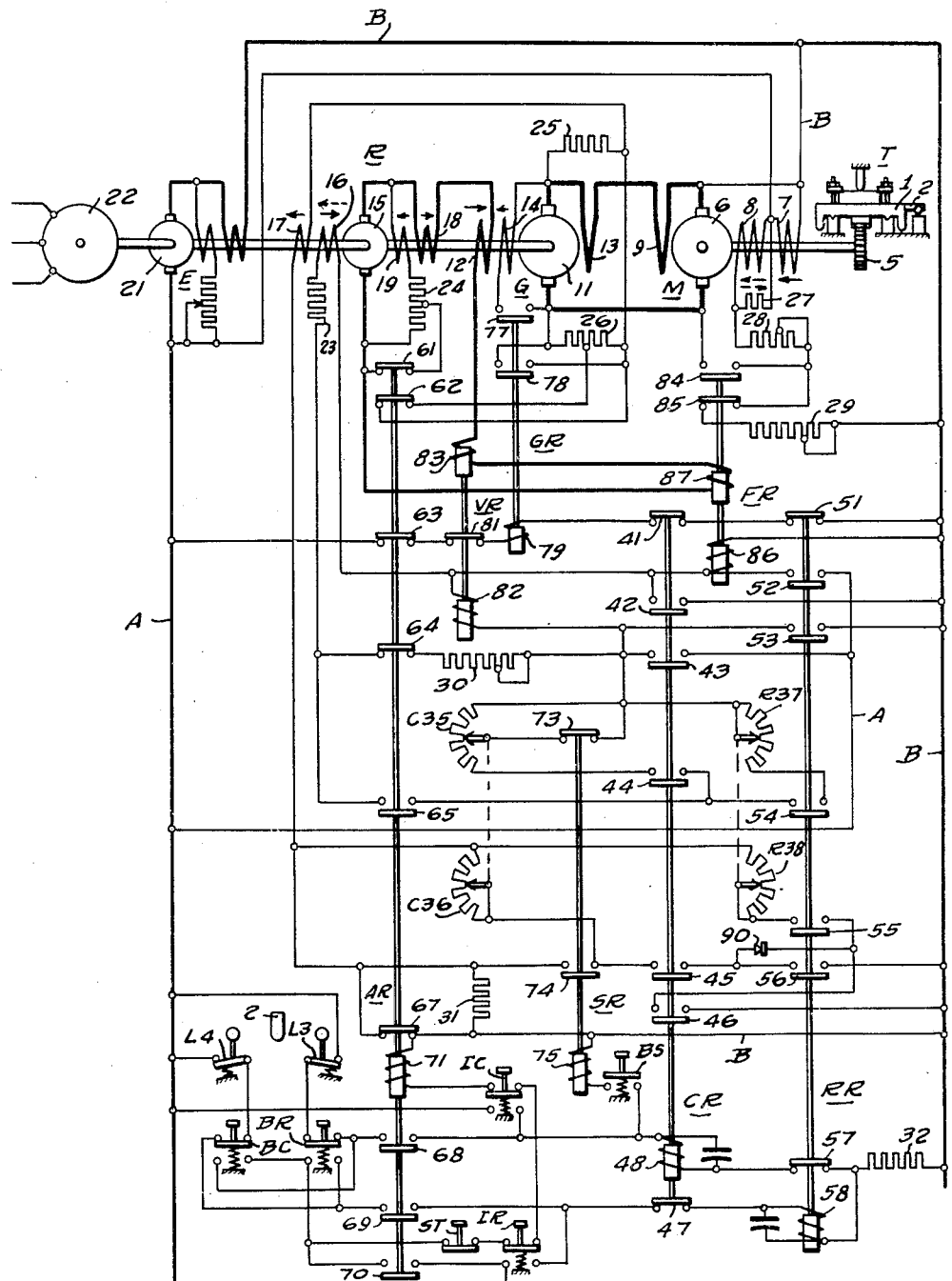

2,498,280

UNITED STATES PATENT OFFICE 2,498,280

ADJUSTABLE-VOLTAGE DRIVE FOR REVERSIBLE OPERATION

George E. King, Pittsburgh, Pa., assignor to Westinghouse Electric Corporation, East Pittsburgh, Pa., a corporation of Pennsylvania Application June 19, 1948, Serial No. 33,937

14 Claims. (Cl. 318—154)

My invention relates to adjustable-voltage drives for operating a reciprocable or reversible structure at controllable speed, as is required, for instance, for driving the platen of a planer or the reciprocable workpiece or tool carrier of other machine tools and fabricating machinery.

Drives of the kind here concerned have a direct-current motor energized by adjustable voltage from a generator whose field is controlled in dependence upon an adjustable pattern voltage and a variable pilot voltage, the latter being indicative of a motor operating condition, such as the speed, to be controlled.

It is an object of the invention to provide a reversible drive of the kind mentioned that affords a wide range of speed control, for instance, of 1 to 8 up to 1 to 12 or more, while also securing a smooth and fast acceleration and braking with a high degree of safety from running past the desired ends of travel under any operating conditions.

Another object is to secure a stabile operation of the drive system at all available speeds and at an optimum rate of acceleration and braking.

According to one feature of the invention, I provide the pilot field circuit with a voltage controlling rheostat and gang it together with the speed control rheostat of the pattern field circuit so that, as the resistance in the pattern field is changed for reducing the pattern voltage and motor speed, the resistance in the pilot field circuit is simultaneously changed to increase the pilot voltage.

According to another feature of the invention, I connect a half-wave rectifier or valve in the pilot circuit and reverse the polarity of connection of the valve under control by the motor-reversing contactors or relays so that the valve conducts in different directions, respectively, during forward and reverse strokes and, during both strokes, has a blocking effect only while the motor is subjected to regenerative braking. In this manner, the peak currents otherwise occurring when regeneratively braking the motor from high speed are limited without affecting the current during acceleration and steady state conditions.

According to another feature of the invention, referring to a machine tool drive equipped with limit switches for reversing the motor at the end of forward and return strokes and with a stop contact for arresting the drive, I apply to the pilot field circuit an increased voltage under control by the stop contact so that the pilot field voltage imposes a strong forcing action on the generator which causes the generator voltage and motor speed to decrease rapidly in order to prevent overshooting of the driven structure, especially if the stop contact is actuated when the structure is approaching one of the limit switches. In a more specific aspect of this feature, I provide contact means that short-circuit the above-mentioned valve when the stop contact is actuated, thus securing or increasing the decelerating forcing action.

In accordance with another feature of the invention, I provide the motor, preferably in addition to a constant main field, with an auxiliary field circuit or field winding that is connected between constant-voltage buses in series with the generator armature so that the constant bus voltage and the variable generator voltage are series-opposed to each other and cause the auxiliary motor field to boost or buck the main field to obtain a resultant full (maximum) field at low generator voltage and minimum field at high generator voltage. According to a more specific feature, I normally excite the auxiliary motor field from the constant voltage buses in boost relation to the main field, and provide a relay, responsive to the generator voltage, for causing the auxiliary field to receive braking voltage from the generator only when the generator voltage is below a given small value, thus maintaining full motor field until the motor approaches zero speed.

Drive systems according to the invention are preferably equipped with an auxiliary or regulating generator whose armature voltage controls the field excitation of the motor-energizing main generator; and the above-mentioned pattern and pilot field circuits act on the field of the regulating generator. Referring to such a system, it is also a feature of my invention to equip the regulating generator with self-excitation by means of two field windings and appertaining circuits designed as follows. One of the self-exciting windings is series-connected in the armature circuit of the regulating generator and dimensioned to provide the major component of the total field. The other winding is shunt-connected to the armature of the regulating generator and provides a minor component field in opposition to that of the series winding and hence in a voltage reducing sense. In this manner, the shunt field winding normally acts as an anti-hunt winding. A resistor in the circuit of the shunt field winding is dimensioned so that normally the resultant differential self-excitation substantially coincides with the linear portion of the magnetic no-load characteristic of the regulating generator; and I also provide control means that reduce the resistance of the resistor when the drive is to stop, so that then the shunt field increases and imposes a downward forcing on the generated voltages and on the speed of the motor.

These and other objects and features of the invention will be apparent from the following description of the planer drive according to the invention exemplified by the drawing.

In the drawing, a planer is schematically represented at T. The platen 1 for the workpiece is reciprocable perpendicularly to the plane of illustration and is equipped with one or several dog pins, such as the one denoted by 2, for actuating a cut limit switch and a return limit switch when the platen reaches the ends of its cut and return strokes respectively. The cut limit switch and return limit switch with the actuating dog 2 are separately shown at L3 and L4, respectively. The platen 1 is driven through a gear 5 from the armature 6 of a reversible direct-current motor M with a main field winding 7, an auxiliary field winding 8 and a compensating or interpole field winding 9. The armature circuit of the motor is loop connected with the armature 11 of a main generator G. The generator has a separately excited main field winding 12, a series connected interpole or compensating field winding 13 and a suicide field winding 14.

Excitation for the main field winding 12 of generator G is provided from the armature 15 of a regulating generator R which is equipped with a separately excited pattern field winding 16, a separately excited pilot field winding 17, a self-excited series field winding 18 and a self-excited shunt field winding 19.

The system requires an auxiliary direct-current source of substantially constant voltage which, in the illustrated example, consists of an exciter generator E whose armature 21 is shown to be driven by a constant speed motor 22 together with the armatures 15 and 11 of generators R and G. If desired, a separate drive may be provided for the main generator G. The direct-current source may consist of an available direct-current line. The constant voltage buses of the direct-current source E are denoted by A and B.

The system includes a number of resistors or rheostats denoted by numerals from 23 through 32. The connection and function of these resistors will be explained below. In addition, two potentiometric rheostats C35 and C36 are provided. The appertaining slide contacts are ganged together; their selected position determines the speed at which the motor M is supposed to run in the cut direction. Similar rheostats R37 and R38 with interconnected sliders are provided for adjusting a desired speed for the return stroke.

The rheostats C35 and C36 are connected in the circuits of the pattern field winding 16 and pilot field winding 17, respectively, by means of a "cut" relay CR with contacts 41 through 47 controlled by a relay coil 48. The rheostats R37 and R38 are connected in the same respective field circuits under control by a "return" relay RR whose contacts 51 through 57 are controlled by a coil 58.

The system is also equipped with an accelerating relay AR with contacts 61 to 65 and 67 to 70 controlled by a coil 71. An auxiliary relay for temporary slow operation is denoted by SR; its contacts 73, 74 are controlled by a coil 75, which, in turn, is controlled by a push button contact BS. It should be understood that the provision of the slow down relay SR is incidental; that is, this relay and its immediate accessories and performance are not part of the invention proper and may be omitted without affecting the design and function of the invention.

The suicide field winding 14 of generator G is connected across the armature 11 under control by a relay GR whose contacts 77 and 78 are actuated by a coil 79. A voltage relay VR has a contact 81 under control by two coils 82 and 83. The circuit of the motor field winding 8 is under control by a field relay FR with contacts 84, 85 actuated by coils 86 and 87.

A valve or rectifier 90 is disposed in the circuit of the pilot field winding 17 under control by the cut relay CR and return relay RR, so that its polarity of conductance during the cut performance of the motor is opposite to the polarity of connection during the return performance.

Operator-actuable contacts or switches, such as push button contacts, are denoted by BC, BR, ST, IC and IR.

When "cut" contact BC is depressed, the motor is started in the cut direction and the platen 1 is thereafter reciprocated until the system is deenergized and the motor stopped by the actuation of the "stop" contact ST. During the cut strokes, motor and platen move at a speed determined by the selected setting of the cut rheostats C35, C36. During the return stroke the speed is determined by the setting of the rheostats R37, R38. When during the operation the "slow" contact BS is actuated, the speed is reduced to a given low value as long as the contact BS is held depressed by the operator. When the motor is at rest, the actuating of "inching" contacts IC or IR causes the drive to inch the platen in the forward or return direction, respectively. The inching movement lasts only as long as the respective buttons IC and IR are held depressed.

How the just-mentioned performance comes about and what particular functions and advantages are secured by virtue of the invention will be explained presently.

The pattern field winding 16 of the regulating generator R forms the only source of excitation for the main generator field 12. The regulating generator R is designed to have a high sealing voltage so it can force the buildup of the main generator field. The pattern field winding 16 of generator R is excited from across the constant voltage buses A and B through one of the reversing relays CR and RR and one of the rheostats C35 and C37 at a time. Consequently, the polarity of the excitation applied to the pattern field winding 16 is determined by which of relays CR and RR is picked up at a time, and the magnitude of excitation is determined by the selected setting of rheostat C35 or rheostat R37.

The circuit of the pilot field winding 17 extends through the resistor 25 and in series through the field windings 13 and 19. The resistor 25 is connected in series with resistor 26 across the armature 11 of the main generator G so that the voltage drop across resistor 25 is proportional to the armature voltage of generator G. The voltage drop impressed across field windings 13 and 9 due to the armature current of the motor is proportional to that current, and consequently proportional to the IR drop in the armature circuit. The voltage drop across resistor 25 and the voltage drop across field windings 9 and 13 are so proportioned relative to each other that the resultant voltage impressed on the pilot field winding 17 is proportional to the counter EMF of motor M, and consequently substantially proportional to the motor speed.

The pilot field winding 17 is connected so that its ampere turns are differential to those of the pattern field windings, and the fields of windings 16 and 17 are balanceable against each other.

The self-excited field winding 18 of the regulating generator R provides the major portion of the field excitation for generator R. The field winding 19 provides an anti-hunt field and is connected across the armature 15 through the resistor 24. The polarity of connection is such that the anti-hunt field is in opposition to the field of the self-excited winding 18. Since the ampere turns of the anti-hunt field subtract from those of the self-excited field provided by winding 18, strengthening of the anti-hunt field has the same effect as adding resistance in series with the field winding 18. Consequently, by adjusting the resistor 24, the resultant self-excitation of generator R, jointly provided by windings 18 and 19, can be made to substantially coincide with the approximately linear, unsaturated portion of the magnetic no-load characteristic of generator R. With such an adjustment, the field excitation of generator R needed to maintain its output voltage at any desired value within the available range is supplied mainly by windings 18 and 19, so that the pattern field winding 16 and pilot field winding 17 are only called upon to provide the slight additive or subtractive field excitation needed to shift the voltage to a higher or lower value. Consequently, the regulating generator R operates as a highly effective and sensitive amplifier which causes proportionately large voltage changes to occur across the main field winding 12 of generator G in response to very small changes in the voltages applied to the pattern and pilot field circuits. It should be understood that other types of regulating generators with an inherent high amplification, such as armature-reaction excited amplifying machines or double-stage machines may be used instead of the one illustrated.

When the motor 22 is running at normal speed and the direct-current buses A and B are energized, the generator G is at zero voltage as long as none of the push button contacts is actuated. The voltage generated in the armature 15 of the regulating generator R is zero, because the circuit of its pattern field winding 16 is interrupted at contact 42 of relay CR, also at contact 52 of relay RR and at contact 65 of relay AR; and the circuit of the pilot field winding 17 is not excited because the voltage across resistor 25 is zero and the voltage across field windings 9 and 13 is also zero. Relay GR is in picked up position, because its coil 79 is excited in the circuit

A—63—81—79—41—51—B      (1)

so that contact 77 of relay GR connects the suicide field winding 14 across the armature 11 in order to prevent a residual generator voltage which may cause creeping of the motor M.

When the cut contact BC is depressed by the operator, coil 71 of relay AR becomes excited in the circuit

A—L3—BR—BC—ST—IR—IC—71—B      (2)

Relay AR picks up and holds itself in at contact 70 in the circuit

A—70—ST—IR—IC—71—B      (3)

Consequently, the subsequent release of push button BC by the operator has no further effect.

Contact 68 of relay AR closes for coil 48 of cut relay CR, the circuit

A—L3—BR—68—48—57—32—B      (4)

Relay CR picks up. Relay GR drops out when the contact 63 of relay AR opens the circuit (1). The pattern field winding 16 is now excited across buses A and B in the circuit

A—43—C35—44—65—23—16—42—B      (5)

and receives pattern excitation determined by the setting of cut rheostat C35.

The pilot field winding 17 is now connected in the circuit

B—9—13—25—17—C36—45—90—46—B      (6)

This circuit includes resistor 25 which provides a voltage proportional to the generator voltage of generator G. The circuit (6) includes also the series field windings 13 and 9 which provide a smaller voltage proportional to the IR drop in the motor armature circuit. As explained, the resultant of the two voltages is proportional to the motor speed. The resultant excitation of pilot field winding 17 also depends upon the adjustment of cut rheostat C36 whose purpose will be explained below. The pilot field circuit also includes the valve 90 to prevent a reverse current flow during regenerative periods of motor M.

Since at first the voltage of generator G and the current flowing through motor armature 6 increase from zero values, the control excitation of the regulating generator R is initially determined by the pattern field excitation. As the generator G builds up voltage and the motor M accelerates, the excitation of pilot field winding 17 increases until the motor speed reaches the value set by the cut rheostat C35. At that moment the pilot field substantially balances the pattern field. From then on, the self-excitation of generator R keeps its output voltage at the value required for maintaining generator G at the proper voltage and motor M at the proper speed. When the motor speed increases above the correct value, the pilot excitation of field winding 17 increases accordingly and reduces the resultant excitation of generator R with the effect of reducing the voltage of generator G to the extent needed to reestablish the proper motor speed. When the motor speed drops below the correct value, the excitation of the pilot field winding 17 decreases so that the resultant control field of generator R increases and causes the generator G to increase its output voltage thereby raising the motor speed back to the correct value.

In summary, the actuation of contact BC by the operator has the effect of causing the motor to run in the cut direction at the selected speed. When the reciprocable structure 1 reaches the adjusted end point of its travel in the cut direction, the limit switch dog 2 opens the cut limit switch L3. Switch L3 interrupts the circuit (4), so that relay CR drops out and opens the circuits (5) and (6) of the pattern and pilot field windings, respectively. Contact 47 of relay CR now closes for coil 58 of the return relay RR the circuit

A—L4—BC—69—47—58—32—B      (7)

and relay RR closes at contacts 52, 53, 54, for pattern field winding 16 another circuit which extends through

B—53—R37—54—65—23—16—52—A      (8)

The circuit (8) is of reverse polarity, as compared with the pattern field circuit (4) previously effective, and includes the return rheostat R37. Relay RR also closes for pilot field winding 17 the circuit

B—9—13—25—17—R38—55—90—56—B (9)

The pilot field circuit (9) includes the return rheostat R38 and the valve 90, but the polarity of valve 90 is now reversed as compared with its connection in the circuit (6). The motor now runs in the return direction at a speed determined by the setting of rheostats R37 and R38.

At the end of the return stroke the limit switch L4 is opened. Relay RR drops out and relay CR comes in as before so that the cycle is repeated until the stop contact ST is depressed which causes relays AR and CR or RR to drop out, thus deenergizing the motor.

During the above-described operations, the forcing effect of the regulating generator R is determined by the strength of its pattern field. As the pattern field strength is decreased by the speed regulating rheostats to obtain low speeds, the forcing effect is decreased. A constant accelerating rate could be obtained by keeping the pattern field excitation constant and by regulating the motor speed by means of rheostats in series with the pilot field winding. This would be satisfactory except that at low speeds the forcing effect would cause hunting due to the fact that the regulating generator R is capable of supplying many times the excitation to the generator shunt field required for low speed than is required for high speed. In order to obtain a stable operation at all speeds and also the maximum rate of acceleration, tandem type rheostats are used (C35, C36 and R37, R38) in the circuits of both the pattern and pilot field windings. Hence, as resistance is inserted in the pattern field circuit, resistance is cut out of the pilot field circuit. In this way, the pattern field can be maintained at the maximum strength at low speed consistent with stable operation.

Maximum armature current peaks occur when braking from maximum speed. It will be noted that, when accelerating, the only forcing action is from the pattern field. However, at the end of a stroke the pattern field is reversed so that the pilot field is now cumulative with the pattern field with the result that both fields then provide forcing action. When strong fields are used, this may cause excessive armature currents. However, the armature current is limited by the valve 90 in series with the pilot field so that at the reversing instant the valve has a blocking effect. Only after the generator voltage decreases to zero and reverses, does valve 90 permit the excitation of the pilot field. Consequently, valve 90 acts as a blocking means only while the motor is regeneratively braking. The resistor 31 across the valve 90 permits increasing the forcing action during braking as much as possible consistent with good commutation.

As previously mentioned, the pattern field is reversed to reverse the direction of rotation of the motor, and the pattern field forces the generator voltage down quickly and consequently forces the motor to brake rapidly. When the stop contact ST is operated, the pattern field is deenergized and, unless some means are provided to force the generator voltage down quickly, the motor will make more revolutions in coming to rest than when the pattern field is reversed. If the stop contact is operated at approximately the same time the dog 2 strikes a limit switch, the planer platen may drift beyond the normal limit switch overtravel distance and may damage the planer, tool or workpiece or injure the operator if the tool is working in a pocket or the workpiece does not clear the planer cross rail. However, such occurrences are prevented as follows. Pressing the stop contact 12 causes the relay AR to drop out. Contact 67 then shorts the valve 90, contact 62 shorts out part of resistor 26 thus applying a higher voltage to the pilot field winding 17; and contact 61 shorts part of the resistor 24 in series with the anti-hunt field winding 19. As a result, the generator R forces the main generator voltage down quickly and, at a preset low voltage, relay VR drops out and energizes relay GR which applies full voltage to the pilot field winding 17 and at the same time connects the suicide field winding 14 across the generator armature 11 to prevent creeping. Relay VR is picked up by the voltage coil 82 and is held to a low generator voltage by the coil 83 in series with the generator main field winding 12.

The field winding 8 of the motor M is connected in series with resistor 28 to the common point of contacts 84 and 85 of relay FR. This relay is a double throw switch. During the cut strike, relay FR is deenergized and the normally closed contact 85 connects field winding 8 across buses A and B so that winding 8 is cumulative with the main field winding 7. During the return stroke, coil 86 of relay FR is energized and contact 84 closes, thus connecting the field winding 8 to the generator armature. Field winding 8 is now connected across mains A and B in series with armature 11 in such a manner that at zero generator voltage this field winding receives full cumulative excitation from the buses A, B. As the voltage of generator G builds up, the excitation of field winding 8 becomes less. At the time the generator voltage equals the bus voltage the excitation is zero, and when the generator voltage is greater than the bus voltage, field winding 8 is excited differentially to the main field winding 7. The maximum generator voltage causes the maximum differential excitation for field winding 8 thus causing the motor to run at maximum speed. The current coil 87 of relay FR is connected to be cumulative with voltage coil 86 during the return stroke. Current coil 87 prevents relay FR from picking up at the instant the return contactor RR closes if the motor had been running in the cut direction. This has the desirable result of maintaining full field on the motor until zero speed is approached. Assume that the motor is running in the cut direction. Near the end of the cut stroke, the cut limit switch L3 operates. Cut relay CR drops out, and return relay RR picks up. The voltage coil of relay FR is then energized, but the relay does not pick up because the current coil 87 is energized differentially until the current in the generator main field winding 12 and consequently the generator voltage approach zero. Only then can relay FR connect the auxiliary motor field winding to the generator. However, the motor field excitation remains the same as before until the generator voltage builds up. At the end of the return stroke, the voltage coil 86 of relay FR is deenergized and relay FR drops out applying full field to the motor immediately, as the excitation of the current coil 87 is then not strong enough to hold relay FR closed.

The drive system, as will be recognized, secures a fast and smooth acceleration and braking, high return speeds and great safety. In these respects, systems according to the invention are superior to those heretofore available for comparable purposes.

While I have illustrated separate pattern and pilot field windings on the regulating generator, and separate main and auxiliary field winding on the motor, it should be understood that in either or both machines a single field winding may be used instead by properly superimposing the two excitation voltages, such as the pattern and pilot voltages, on each other in the field circuit of that winding. It will be obvious to those skilled in the art, after a study of this disclosure, that drive systems according to my invention can also be modified in various other ways and as regards different system components and circuits without foregoing the objects and advantages of the invention and within the scope of its essential features as set forth in the claims annexed hereto.

I claim as my invention:

1. In a motor control system, the combination of a direct-current motor and a generator having an armature circuit in common, said generator having field control means which comprise a pattern field circuit and pilot field circuit differentially related to each other, a direct-current source with voltage adjusting means connected to said pattern field circuit for providing said pattern field circuit with adjusted pattern voltage in accordance with a desired motor speed, a condition-responsive voltage source connected with said motor and connected with said pilot field circuit for providing said pilot field circuit with variable pilot voltage in dependence upon an operating condition of the motor, and voltage adjusting means disposed in said pilot circuit and ganged together with said first-mentioned voltage adjusting means to increase said pilot voltage when said pattern voltage is decreased.

2. In a motor control system, the combination of a direct-current motor having a common armature circuit, said generator having field control means which comprise a pattern field circuit and a pilot field circuit, direct-current supply means and a first adjustable rheostat connected with said pattern field circuit to provide it with pattern voltage adjustable by said rheostat in accordance with a desired motor speed, a condition-responsive voltage source connected with said motor for providing variable pilot voltage indicative of the motor speed, said voltage source being connected with said pilot field circuit and poled to have said pilot voltage act in opposition to said pattern voltage, and a second adjustable rheostat connected with said pilot circuit for adjusting said pilot voltage and ganged together with said first rheostat to increase said pilot voltage when said pattern voltage is increased.

3. In a motor control system, the combination of a direct-current motor and a generator having an armature circuit in common, a field winding on said generator, a regulating generator having an armature connected to said field winding to provide excitation therefor and having a pattern field circuit and a pilot field circuit differentially related to each other for jointly controlling said excitation, direct-current supply means with a voltage adjusting rheostat connected to said pattern field circuit for providing said pattern field circuit with adjusted pattern voltage in accordance with a desired motor speed, a condition-responsive voltage supply means connected with said motor and connected with said pilot field circuit for providing said pilot field circuit with pilot voltage dependent upon the motor speed, and another voltage adjusting rheostat disposed in said pilot circuit and ganged together with said first-mentioned rheostat for increasing said pilot voltage when said pattern voltage is reduced.

4. In a motor control system, the combination of a direct-current motor and a generator having an armature circuit in common, said generator having field control means which comprise a pattern field circuit and pilot field circuit differentially related to each other, direct-current supply means of adjustable voltage connected with said pattern field circuit, condition-responsive current-supply means connected with said motor and with said pilot field circuit to provide said pilot field circuit with pilot voltage substantially in accordance with the motor speed, control means having a contact in said pattern field circuit for opening it to deenergize said motor and being connected with said pilot field circuit for increasing the pilot voltage when said pattern field circuit is opened.

5. In a motor control system, the combination of a direct-current motor and a generator having an armature circuit in common, said generator having field control means which comprise a pattern field circuit and pilot field circuit differentially related to each other, said pattern field circuit having voltage supply means adjustable in accordance with a desired motor speed, said pilot field circuit being connected with said motor to be excited substantially in accordance with the actual motor speed, a valve disposed in said pilot field circuit and poled to block the flow of current therein during regenerative operation of said motor, and control means having a contact in said pattern field circuit for opening it to deenergize said motor and having another contact connected across said valve for shorting it when said pattern field circuit is opened.

6. In a motor control system, the combination of a direct-current motor and a generator having an armature circuit in common, said generator having field control means which comprise a pattern field circuit and pilot field circuit differentially related to each other, direct-current supply means of adjustable voltage connected with said pattern field circuit, condition-responsive current-supply means connected with said motor and with said pilot field circuit to provide said pilot field circuit with pilot voltage substantially in accordance with the motor speed, reversing contact means disposed in said pattern field circuit for reversing the polarity of connection of said direct-current supply means in order to reverse said motor, a valve disposed in said pilot so as to reverse its polarity of connection when said motor is reversed so as to block the flow of current in said pilot field circuit only during regenerative operation of said motor.

7. A motor control system, comprising a direct-current motor having an armature, a generator having an armature loop-connected with said motor armature, field control means connected with said generator for controlling the motor speed, said motor having field means with two field circuits, direct-current supply means of substantially constant voltage, one of said field circuits being connected across said supply means for normally constant excitation, a relay connected with said generator to change its position at a given low generator voltage and having contact means connecting said other field circuit across said supply means in boost relation to said one field circuit when said voltage is above a given value and connecting said generator armature and said supply means in series-opposed relation to said other field circuit for reducing the motor field when said voltage is above said value.

8. A reversible adjustable-speed drive, comprising a direct-current motor having an armature, a generator having an armature loop-connected with said motor armature, control means connected to said generator to provide field excitation therefor and having contact means for reversing said excitation to reverse said motor, said motor having two field circuits, direct-current supply means connected to one of said circuits to provide it with normally constant excitation, and circuit means connected to said other field circuit and controlled by said contact means so as to excite said other field circuit in boost relation to said one field circuit when said contact means are set for one running direction of said motor and in buck relation when said contact means are set for the other running direction.

9. A reversible adjustable-speed drive, comprising a direct-current motor having an armature, a generator having an armature loop-connected with said motor armature, control means connected to said generator to provide field excitation therefor and having contact means for reversing said excitation to reverse said motor, said motor having two field windings, direct-current supply means of substantially constant voltage connected to one of said windings, relay means connected to said generator and to said contact means to respond when the generator voltage traverses a given value while the motor is set for operation in one given direction, said relay having contact means connecting said other winding to said supply means in boost relation to said one winding and connecting said generator armature and said supply means in series-opposed relation to said other winding when said relay responds to said generator voltage dropping below said given value so as to cause the generator voltage to weaken the motor field during operation in said one direction.

10. A reversible drive, comprising a direct-current motor, a generator therefor having voltage reversing means for running the motor in forward and return directions, said motor having field means with the field circuits, direct-current supply means of substantially constant voltage normally connected to said field circuits for exciting them cumulatively, a relay having a coil connected to said reversing means to be in pickup condition only when said reversing means are set for return direction, said relay having a voltage-responsive other coil connected to said generator and poled to be cumulative to said one coil only when the generator voltage is poled for forward direction, said relay having contact means connecting said generator in series opposition to said supply means with said other coil when said relay is picked up.

11. An adjustable-voltage drive, comprising a direct-current motor and a generator having an armature circuit in common, said generator having a field circuit, an auxiliary generator having an armature connected in said field circuit and having control field means and two mutually differential self-excited field windings, one of said windings being series connected in said field circuit, a resistor series-connected with said other winding across said armature and having a resistance value dimensioned so that the differential self-excited field of said two windings approximately coincides with the linear portion of the magnetic no-load characteristic of said auxiliary generator, contact means connected with said control field means for deenergizing said control field means to initiate stopping of said motor, and circuit means connected with said resistor and controlled by said contact means to reduce said resistance below said value to vary said self-excited field in the voltage reducing direction.

12. An adjustable-voltage drive, comprising a direct-current motor and a generator having an armature circuit in common, said generator having a field circuit, an auxiliary generator having an armature connected in said field circuit and having a pattern field circuit to provide an adjusted speed-controlling field and a pilot circuit in opposed relation to said pattern field circuit to provide a variable reference field, said auxiliary generator having two mutually differential self-excited field windings of which one is series-connected with said armature and poled in voltage-sustaining sense, a resistor series connected with said other winding across said armature and having a resistance value dimensioned so that the differential self-excited field of said two windings approximately coincides with the linear portion of the magnetic no-load characteristic of said auxiliary generator, contact means connected with said pattern field circuit for opening it when said motor is to be stopped, and circuit means connected with said resistor and controlled by said contact means to reduce said resistance below said value to vary said self-excited field in the voltage reducing direction.

13. With an adjustable-voltage drive according to claim 12, in combination, voltage control means disposed in said pilot field circuit and operatively connected with said contact means so as to increase the voltage of said pilot circuit when said contact means are actuated to initiate stopping of said motor.

14. An adjustable-voltage drive, comprising a direct-current motor and a generator having an armature circuit in common, said generator having a field circuit, an auxiliary generator having an armature connected in said field circuit and having a pattern field circuit to provide an adjusted speed-controlling field and a pilot circuit in opposed relation to said pattern field circuit to provide a variable reference field, contact means disposed in said pattern field circuit for deenergizing it when said motor is to be stopped, and voltage control means disposed in said pilot field circuit and operatively connected with said contact means so as to increase the voltage of said pilot circuit when said contact means are actuated.

GEORGE E. KING.

REFERENCES CITED

The following references are of record in the file of this patent:

UNITED STATES PATENTS

| Number | Name | Date |
|---|---|---|
| 2,420,884 | King et al. | May 20, 1947 |